US007079175B2

(12) United States Patent
Sumiya et al.

(10) Patent No.: US 7,079,175 B2
(45) Date of Patent: Jul. 18, 2006

(54) TELEVISION INTERCOM SYSTEM

(75) Inventors: Hiroshi Sumiya, Nagoya (JP); Tatsuru Shinozaki, Nagoya (JP); Toshitaka Iwata, Nagoya (JP)

(73) Assignee: Aiphone Co., Ltd., Nagoya (JP)

( * ) Notice: Subject to any disclaimer, the term of this patent is extended or adjusted under 35 U.S.C. 154(b) by 754 days.

(21) Appl. No.: 10/310,883

(22) Filed: Dec. 6, 2002

(65) Prior Publication Data
US 2003/0184648 A1 Oct. 2, 2003

(30) Foreign Application Priority Data
Mar. 27, 2002 (JP) ............................. 2002-089488

(51) Int. Cl.
*H04N 7/18* (2006.01)
(52) U.S. Cl. ........................................ 348/156; 725/84
(58) Field of Classification Search ................ 348/155, 348/156, 151, 152, 143; 725/84, 83, 130
See application file for complete search history.

(56) References Cited
U.S. PATENT DOCUMENTS 4,249,206 A * 2/1981 Roscoe ........................ 725/84
5,345,592 A * 9/1994 Woodmas .................... 725/130
5,428,388 A * 6/1995 von Bauer et al. .......... 348/155

* cited by examiner

*Primary Examiner*—Gims Philippe
(74) *Attorney, Agent, or Firm*—Bacon & Thomas, PLLC

(57) ABSTRACT

A television intercom system need not prepare two kinds of electric power source adaptors even when it is equipped with an expanded monitor master station, and need not either use an electric power source adaptor having a large capacity. In the television intercom system, a picture bus controller supplies electric power sources to a camera-equipped entrance substation, a monitor master station and an expanded monitor master station, and a picture picked up by the camera-equipped entrance substation is displayed on the monitor master station and the expanded monitor master station. The picture bus controller includes an electric power source expansion sub-adaptor that is the same as an electric power source main adaptor used before expansion when the expanded monitor master station is added, an electric power source detection circuit for detecting the electric power source expansion sub-adaptor, and an electric power source switching circuit for dividedly supplying the electric power source from the electric power source main adaptor used before expansion and from the electric power source expansion sub-adaptor to the picture bus controller, the camera-equipped entrance substation, the monitor master station and the expanded monitor master station.

2 Claims, 2 Drawing Sheets

TELEVISION INTERCOM SYSTEM

BACKGROUND OF THE INVENTION

1. Field of the Invention

This invention relates to a television intercom system. More particularly, the invention relates to a television intercom system equipped with a picture bus controller for supplying respectively an electric power source to a camera-equipped entrance substation, a monitor master station and an expanded monitor master station.

2. Description of the Related Art

A television intercom system having a structure shown in FIG. 2 is known as the television intercom system of the kind described above. In the drawing, the conventional television intercom system includes a camera-equipped entrance substation 10 installed at a residential entrance, a monitor master station 20 and an expanded monitor master station 30 that are installed inside the residence, a picture bus controller 40 for respectively supplying electric power sources to the camera-equipped entrance substation 10, the monitor master station 20 and the expanded monitor master station 30, and an electric power source main adaptor 50 connected to the picture bus controller 40. The camera-equipped entrance substation 10 is connected to the picture bus controller 40 through a first connection line L10. The monitor master station 20 and the expanded monitor master station 30 are connected to the picture bus controller 40 through a second connection line L20, and the electric power source main adaptor 50 is connected to the picture bus controller 40 through a third connection line L30.

The camera-equipped entrance substation 10 includes a picture electric power source separation circuit 110 (hereinafter called "entrance picture electric power source separation circuit 110"), an electric power source circuit 120 (hereinafter called "entrance electric power source circuit 120") and a camera circuit 130 (hereinafter called "entrance camera circuit 130"). The entrance picture electric power source separation circuit 110 is connected to the entrance electric power source circuit 120, the entrance camera circuit 130 and the first connection line L10.

The monitor master station 20 includes a picture electric power source separation circuit 210 (hereinafter called "master station picture electric power source separation circuit 210"), an electric power source circuit 220 (hereinafter called "master station electric power source circuit 220") and a monitor circuit 230 (hereinafter called "master station monitor circuit 230"). The master station picture electric power source separation circuit 210 is connected to the master station power source circuit 220, the master station monitor circuit 230 and the second connection line L20.

The expanded monitor master station 30 includes a picture electric power source separation circuit 310 (hereinafter called "expanded master station picture electric power source separation circuit 310"), an electric power source circuit 320 (hereinafter called "expanded master station electric power source circuit 320") and a monitor circuit 330 (hereinafter called "expanded monitor circuit 330"). The expanded master station picture electric power source separation circuit 310 is connected to the expanded master station electric power source circuit 320, the expanded monitor circuit 330 and the second connection line L20.

The picture bus controller 40 includes a monitor electric power source picture circuit 410, a picture signal amplifier circuit 420, a camera electric power source picture circuit 430 and an electric power source main circuit 440. The monitor electric power source picture circuit 410 is connected to the picture signal amplifier circuit 420, the second connection line L20 and the electric power source main circuit 440. The electric power source main circuit 440 is connected to the third connection line L30. The electric power source main circuit 440 is further connected to the picture signal amplifier circuit 420 and the camera electric power source picture circuit 430. The camera electric power source picture circuit 430 is connected to the picture signal amplifier circuit 420 and the first connection line L10.

Next, the operation of the television intercom system having such a structure will be explained. During stand-by, the electric power source main adaptor 50 supplies the electric power source to the electric power source main circuit 440. The electric power source is further supplied from this electric power source main circuit 440 to the entrance electric power source circuit 120 through the camera electric power source picture circuit 430, the first connection line L10 and the entrance picture electric power source separation circuit 110. At the same time, the electric power source is respectively supplied to the picture electric power source separation circuit 210 and to the expanded master station picture electric power source separation circuit 310 through the monitor electric power source picture circuit 410 and the second connection line L20. Also, the electric power source is respectively supplied from the master station picture electric power source separation circuit 210 to the master station electric power source circuit 220 and from the expanded master station picture electric power source separation circuit 310 to the expanded master station electric power source circuit 320. Consequently, the electric power source is already supplied to each part (circuit) with the exception of the camera circuit 130 of the camera-equipped entrance substation 10, the monitor circuit 230 of the monitor master station 20 and the monitor circuit 330 of the expanded monitor master station 30.

Here, when a visitor pushes a call button (not shown in the drawings) of the camera-equipped entrance substation 10 and calls the monitor master station 20, the operation power source is respectively supplied from the entrance electric power source circuit 120 to the camera circuit 130, from the master station electric power source circuit 220 to the master station monitor circuit 230 and from the expanded master station electric power source circuit 320 to the expanded monitor circuit 330.

When the camera circuit 130, the master station monitor circuit 220 and the expanded monitor circuit 330 become operative, a picture signal of the visitor picked up by a camera (not shown) constituting the camera circuit 130 of the camera-equipped entrance substation 10 is transferred to the master station picture electric power source separation circuit 210 and to the expanded master station picture electric power source separation circuit 310 through the entrance picture electric power source separation circuit 110, the first connection line L10, the camera electric power source picture circuit 430, the picture signal amplifier circuit 420, the monitor electric power source picture circuit 410 and the second connection line L20, and is respectively transferred from the master station picture electric power source separation circuit 210 to the master station monitor circuit 230 and from the expanded master station picture electric power source separation circuit 310 to the expanded monitor circuit 330. Consequently, the picture of the visitor is displayed on a monitor (not shown) constituting each of the master station monitor circuit 230 and the expanded monitor circuit 330.

In the television intercom system having the structure described above, however, the electric power source is supplied from the electric power source main circuit for operating the camera circuit 130, the master station monitor circuit 220 and the expanded monitor circuit 330. Therefore, when a television intercom system having an expanded monitor master station and a television intercom system not having such an expanded monitor master station are compared with each other, a greater capacity of the electric power source required for the electric power source main adaptor 50 is necessary in the former than in the latter. In other words, in the television intercom system having the expanded monitor master station, the electric power source main adaptor 50 must have a large power source of a separate kind so as to the expanded monitor master station that is added. It is also necessary to supply to the market an electric power source adaptor having a greater capacity than the electric power source main adaptor 50 to be used in the case where the expanded monitor master station is not added. However, the cost of production drastically rises in this case.

SUMMARY OF THE INVENTION

To solve these problems, the invention aims at providing a television intercom system that need not prepare two kinds of electric power source adaptors even in a television intercom system having an expanded monitor master station, but can supply an electric power source to each of a camera-equipped entrance substation, a monitor master station and an expanded monitor master station without using an electric power source adaptor having a large capacity.

To accomplish the object described above, the invention provides a television intercom system for respectively supplying electric power sources by a picture bus controller to a camera-equipped entrance substation, a monitor master station and an expanded monitor master station and displaying a picture picked up by the camera-equipped entrance substation on the monitor master station and the expanded monitor master station, wherein the picture bus controller includes an electric power source expansion sub-adaptor that is the same as an electric power source main adaptor used before expansion, to add the expanded monitor master station, an electric power source detection circuit for detecting the electric power source expansion sub-adaptor, and an electric power source switching circuit for dividedly supplying the electric power source from the electric power source main adaptor used before expansion and from the electric power source expansion sub-adaptor to the picture bus controller, the camera-equipped entrance substation, the monitor master station and the expanded monitor master station.

The electric power source switching circuit in the television intercom system according to the invention comprises a relay for supplying the electric power source of a camera circuit of the camera-equipped entrance substation and the electric power source consumed by the picture bus controller itself from the electric power source main adaptor, and the electric power source of a monitor circuit of the monitor master station and the electric power source of a monitor circuit of the expanded monitor master station from the electric power source expansion sub-adaptor when the electric power source detection circuit detects the expanded monitor master station.

In the television intercom system according to the invention, the electric power source main adaptor and the electric power source expansion sub-adaptor that is the same as the former are connected to the picture bus controller, and the electric power source switching circuit dividedly supplies the power sources supplied from the electric power source main adaptor and the electric power source expansion sub-adaptor to the camera-equipped entrance substation, the monitor master station and the expanded monitor master station. Therefore, the electric power sources can be supplied to the camera-equipped entrance substation, the monitor master station and the expanded monitor master station without preparing two kinds of electric power source adaptors and without using an electric power source adaptor having a greater capacity than an electric power source main adaptor.

DESCRIPTION OF THE PREFERRED EMBODIMENTS

A television intercom system according to a preferred embodiment of the invention will be hereinafter explained in detail with reference to the accompanying drawings.

Figure 1:
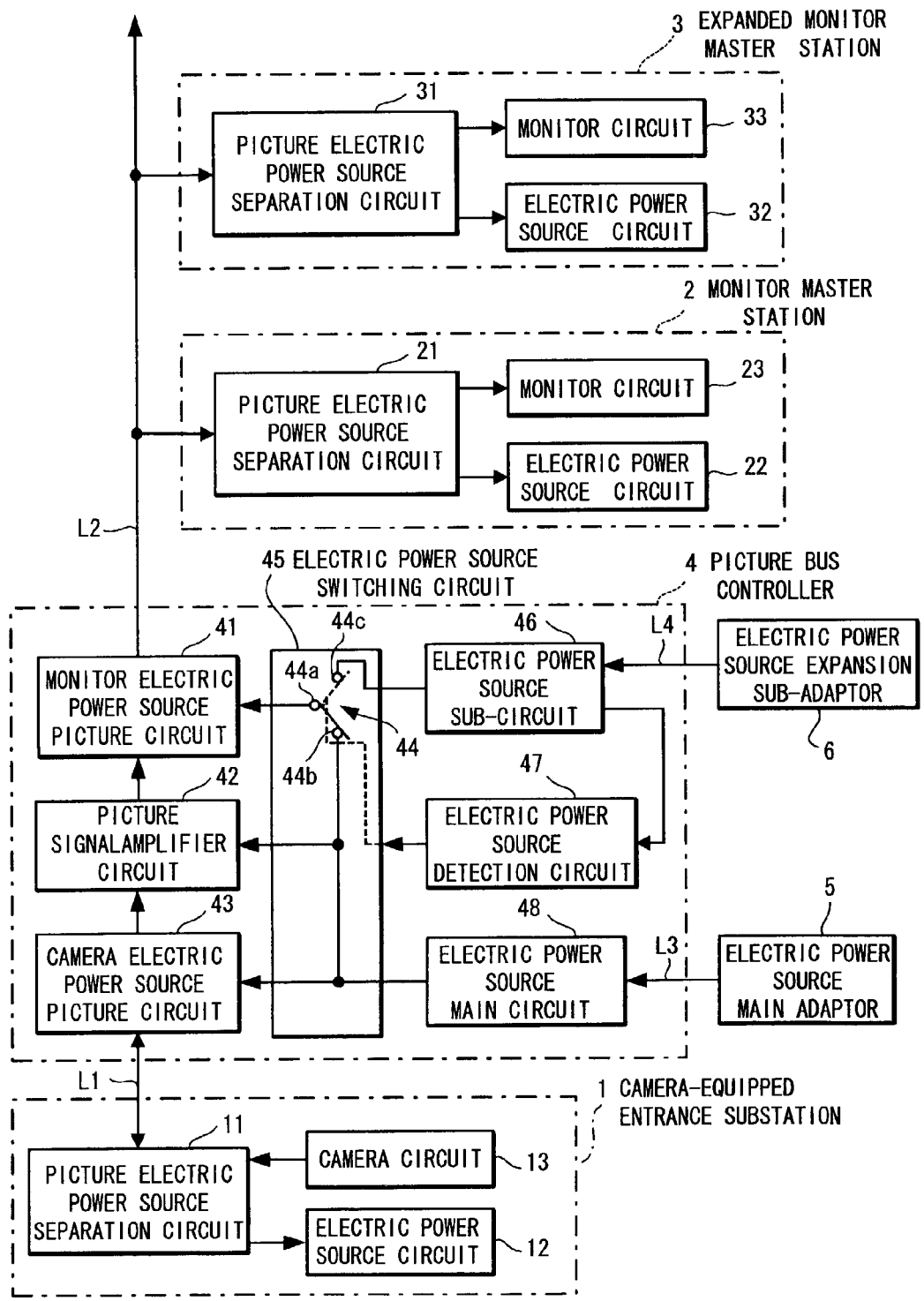
FIG. 1 is a block diagram of a television intercom system according to the invention.
Figure 2:
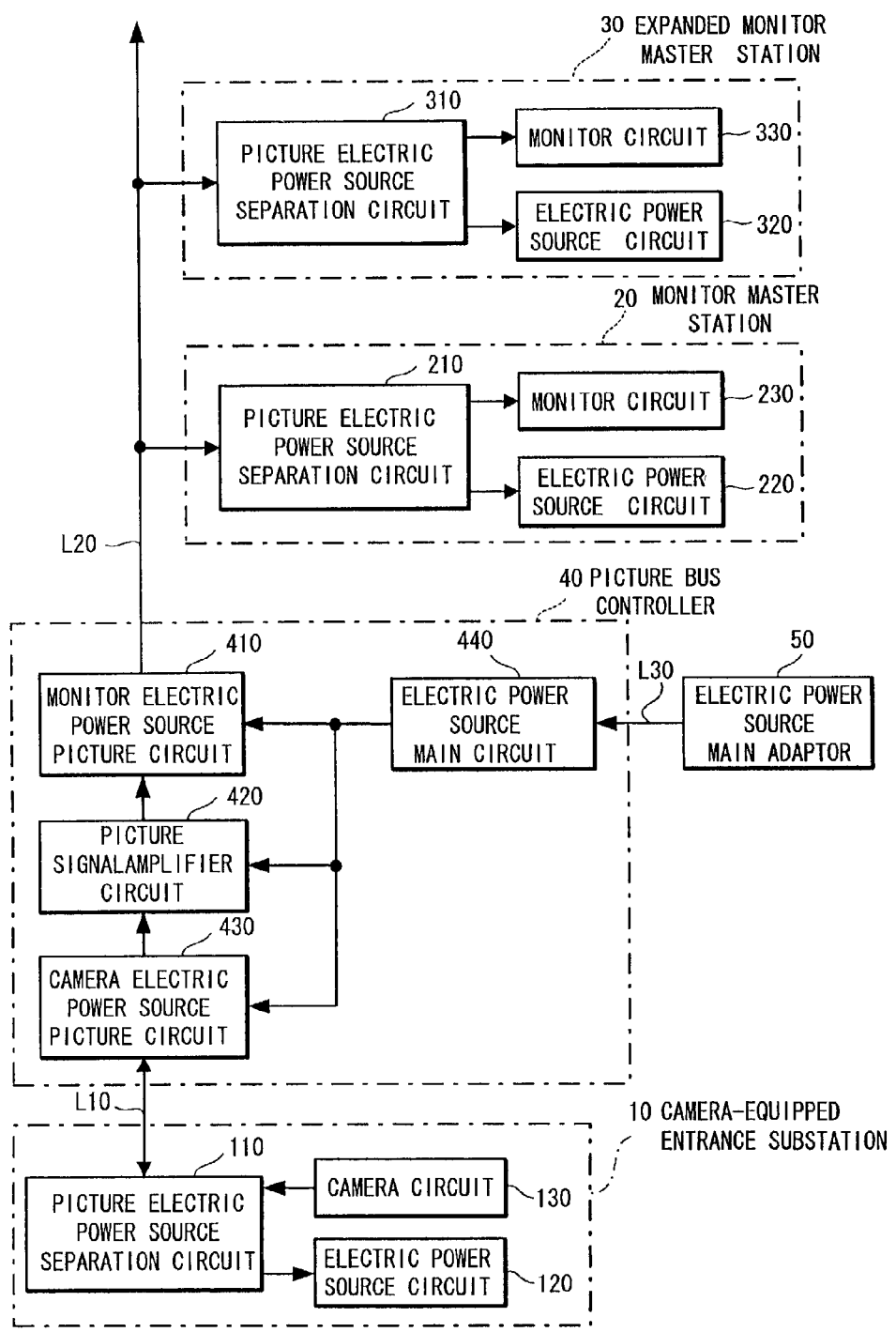
FIG. 2 is a block diagram of a television intercom system according to the related art.

FIG. 1 is a block diagram of a television intercom system according to the invention. In the drawing, the television intercom system of the invention includes a camera-equipped entrance substation 1 installed at the entrance of a residence, a monitor master station 2 and an expanded monitor master station 3 that are installed inside the residence, a picture bus controller 4 for supplying a power source to each of the camera-equipped entrance substation 1, the monitor master station 2 and the expanded monitor master station 3, and an electric power source main adaptor 5 and an electric power source expansion sub-adaptor 6 that are connected respectively to the monitor master station 2 and to the expanded monitor master station 3. Here, the camera-equipped entrance substation 1 is connected to the picture bus controller 4 through a first connection line L1. To this picture bus controller 4 are connected the monitor master station 2 and the expanded monitor master station 3 through a second connection line L2, an electric power source main adaptor 5 through a third connection line L3 and an electric power source expansion sub-adaptor 6 through a fourth connection line L4.

The camera-equipped entrance substation 1 includes a picture electric power source separation circuit 11 (hereinafter called "entrance picture electric power source separation circuit 11"), an electric power source circuit 12 (hereinafter called "entrance electric power source circuit 12") and a camera circuit 13 (hereinafter called "entrance camera circuit 13"). The entrance picture electric power source separation circuit 11 is connected to the entrance electric power source circuit 12, the entrance camera circuit 13 and the first connection line L1.

The monitor master station 2 includes a picture electric power source separation circuit 21 (hereinafter called "master station picture electric power source separation circuit 21"), an electric power source circuit 22 (hereinafter called, "master station electric power source circuit 22") and a monitor circuit 23 (hereinafter called "master station monitor circuit 23"). The master station picture electric power source separation circuit 21 is connected to the master station electric power source circuit 22, the master station monitor circuit 23 and the second connection line L2.

The expanded monitor master station 3 includes a picture electric power source separation circuit 31 (hereinafter called "expanded master station picture electric power source separation circuit 31"), an electric power source circuit 32 (hereinafter called "expanded master station electric power source circuit 32") and a monitor circuit 33 (hereinafter called "expanded monitor circuit 33"). The expanded master station picture electric power source separation circuit 31 is connected to the expanded master station electric power source circuit 32, the expanded monitor circuit 33 and the second connection line L2.

The picture bus controller 4 includes a monitor electric power source picture circuit 41, a picture signal amplifier circuit 42, a camera electric power source picture circuit 43, an electric power source switching circuit 45 having a relay 44, an electric power source sub-circuit 46, an electric power source detection circuit 47 and an electric power source main circuit 48. The relay 44 includes a neutral point 44a, a break contact point 44b and a make contact point 44c. Here, the monitor electric power source picture circuit 41 is connected to the picture signal amplifier circuit 42, the second connection line L2 and the neutral point 44a of the relay 44. The camera electric power source picture circuit 43 is connected to the picture signal amplifier circuit 42, the break contact point 44b of the relay 44, the electric power source main circuit 48 and the first connection line L1. The electric power source main circuit 48 is connected to the third connection line L3. The picture signal amplifier circuit 42 is connected to the electric power source main circuit 48. The electric power source sub-circuit 46 is connected to the electric power source detection circuit 47, the make contact point 44c of the relay 44 and the fourth connection line L4. The electric power source detection circuit 47 is connected to a relay-driving portion (not shown in the drawing).

Next, the operation of the television intercom system having the structure described above will be explained.

In the television intercom system in which the expanded monitor master station 3 is not connected as an expansion unit, the make contact point 44c of the relay 44 is open while its break contact point 44b is closed. In the standby mode, the power source is supplied from the electric power source main adaptor 5 to the electric power source main circuit 48 through the third connection line L3. The electric power source is supplied from this electric power source main circuit 48 to each part (circuit) of the picture bus controller 4. The electric power source is also supplied to the entrance electric power source circuit 12 through the camera electric power source picture circuit 43, the first connection line L1 and the entrance picture electric power source separation circuit 11, and to the master station picture electric power source separation circuit 21 through the monitor electric power source picture circuit 41 and the second connection line L2. The electric power source is supplied from the master station picture electric power source separation circuit 21 to the master station electric power source circuit 22. In consequence, the electric power source has been already supplied to each part (circuit) with the exception of the camera circuit 13 of the camera-equipped entrance substation 1 and the monitor circuit 23 of the monitor master station 2.

Here, when a visitor pushes a call button (not shown) of the camera-equipped entrance substation 1 and calls the monitor master station 2, the operation power sources are respectively supplied from the entrance electric power source circuit 12 to the camera circuit 13 and from the master station electric power source circuit 22 to the master station monitor circuit 22.

When the visitor pushes the call button (not shown) of the camera-equipped entrance substation 1and calls the monitor master station 2 under such a state, the power source is supplied from the electric power source main circuit 48 to the entrance electric power source circuit 12 through the electric power source switching circuit 45, the camera electric power source picture circuit 43, the first connection line L1 and the entrance picture electric power source separation circuit 11. At the same time, the power source is supplied to the master station electric power source circuit 22 through the electric power source switching circuit 45, the monitor electric power source picture circuit 41, the second connection line L2 and the master station picture electric power source separation circuit 21. In consequence, the operation power source is supplied from the entrance electric power source circuit 12 to the camera circuit 13 and from the master station electric power source circuit 22 to the master station monitor circuit 23.

When the camera circuit 13 and the master station monitor circuit 23 becomes active, the picture signal taken by a camera (not shown) constituting the camera circuit 13 of the camera-equipped entrance substation 1 is transferred to the master station monitor circuit 23 through the entrance picture electric power source separation circuit 11, the first connection line L1, the camera electric power source picture circuit 43, the picture signal amplifier circuit 42, the monitor electric power source picture circuit 41, the second connection line L2 (the route of the entrance picture electric power source separation circuit 11, the first connection line L1, the camera electric power source picture circuit 43, the picture signal amplifier circuit 42, the monitor electric power source picture circuit 41 and the second connection line L2 will be hereinafter called a "picture line"), and the master station picture electric power source separation circuit 21. Therefore, the picture of the visitor is displayed on a monitor (not shown) constituting the monitor circuit 23.

Next, the explanation will be given on the case where the expanded monitor master station 3 is connected in expansion to the television intercom system having the structure described above. In this case, since the power source becomes insufficient, the electric power source expansion sub-adaptor 6 is connected in expansion. Then, the power source is supplied from the electric power source expansion sub-adaptor 6 to the electric power source sub-circuit 46 through the fourth connection line L4. When the electric power source detection circuit 47 detects this power source, it operates the relay-driving portion (not shown). In consequence, the break contact point 44b of the relay 44 is opened while its make contact point 44c is closed. Accordingly, the power sources supplied from the electric power source main adaptor 5 and from the electric power source sub-adaptor 6 are distributed in the following way. Namely, the power source is supplied from the electric power source main circuit 48 to each part (circuit) with the exception of the monitor electric power source picture circuit 41 of the picture bus controller 4 through the electric power source switching circuit 45, and to the entrance electric power source circuit 12 through the camera electric power source picture circuit 43, the first connection line L1 and the entrance picture electric power source separation circuit 11. The power source is also supplied from the electric power source sub-circuit 46 to the monitor electric power source picture circuit 41 through the electric power source switching circuit 45 and from this monitor electric power source picture circuit 41 to the master station picture electric power source separation circuit 21 and to the expanded master station picture electric power source separation circuit 31 through the second connection line L2. Furthermore, the power source is supplied from the master station picture electric power source separation circuit 21 to the master station electric power source circuit 22 and from the expanded master station picture electric power source separation circuit 31 to the expanded master station electric power source circuit 32.

Consequently, the operation power source is supplied from the entrance electric power source circuit 12 to the camera circuit 13, from the master station electric power source circuit 22 to the master station monitor circuit 23 and from the expanded master station electric power source circuit 32 to the expanded monitor circuit 33.

When the camera circuit 13, the master station monitor circuit 23 and the expanded monitor circuit 33 become operative, the picture signal of the visitor taken by the camera constituting the camera circuit 13 of the camera-equipped entrance substation 1 is transferred to the master station monitor circuit 23 through the picture line and the master station picture electric power source separation circuit 21 and to the expanded monitor circuit 33 through the picture line and the expanded master station picture electric power source separation circuit 31 in the same way as the afore-mentioned picture signal. In consequence, the picture of the visitor is displayed on the monitor of the monitor master station 2 and the monitor (not shown) of the expanded monitor master station 3.

As is clear from the explanation given above, the television intercom system according to the invention need not be equipped with two kinds of power source adaptors even in a television intercom system having an expanded monitor master station and can supply the power source to a camera-equipped entrance substation, a monitor master station and an expanded monitor master station without using a power source adaptor having a large capacity. The television intercom system of the invention can eventually reduce the cost of production.

What is claimed is:

1. A television intercom system for respectively supplying electric power sources by a picture bus controller to a camera-equipped entrance substation, a monitor master station and an expanded monitor master station and displaying a picture picked up by said camera-equipped entrance substation on said monitor master station and on said expanded monitor master station, wherein said picture bus controller includes an electric power source expansion sub-adaptor that is the same as an electric power source main adaptor used before expansion, to add said expanded monitor master station, an electric power source detection circuit for detecting said electric power source expansion sub-adaptor, and an electric power source switching circuit for dividedly supplying the electric power source from said electric power source main adaptor used before expansion and from said electric power source expansion sub-adaptor to said picture bus controller, said camera-equipped entrance substation, said monitor master station and said expanded monitor master station when said electric power source detection circuit detects said electric power source expansion sub-adaptor.

2. A television intercom system according to claim 1, wherein said electric power source switching circuit comprises a relay for supplying the electric power source of a camera circuit of said camera-equipped entrance substation and the electric power source consumed by said picture bus controller itself from said electric power source main adaptor, and the electric power source of a monitor circuit of said monitor master station and the electric power source of a monitor circuit of said expanded monitor master station from said electric power source expansion sub-adaptor when said electric power source detection circuit detects said electric power source expansion sub-adaptor.

* * * * *